(12) United States Patent
Fickeisen

(10) Patent No.: US 8,342,774 B2
(45) Date of Patent: Jan. 1, 2013

(54) CONVEYING SYSTEM

(75) Inventor: Steffen Fickeisen, Bad Duerkheim (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 348 days.

(21) Appl. No.: 12/398,409

(22) Filed: Mar. 5, 2009

(65) Prior Publication Data

US 2010/0040412 A1  Feb. 18, 2010

(30) Foreign Application Priority Data

Aug. 12, 2008  (DE) ............... 20 2008 010 719 U

(51) Int. Cl.
*E01C 23/14* (2006.01)

(52) U.S. Cl. ......................... 404/95; 198/952
(58) Field of Classification Search .............. 404/95, 404/108; 198/952
See application file for complete search history.

(56) References Cited

U.S. PATENT DOCUMENTS

| | | | | |
|---|---|---|---|---|
| 1,658,881 A * | 2/1928 | Carpenter | | 454/152 |
| 4,561,800 A * | 12/1985 | Hatakenaka et al. | | 404/79 |
| 4,812,076 A * | 3/1989 | Yant | | 404/108 |
| 5,533,829 A * | 7/1996 | Campbell | | 404/81 |
| 5,846,022 A | 12/1998 | Grundl et al. | | |
| 5,899,630 A * | 5/1999 | Brock | | 404/79 |
| 5,938,371 A * | 8/1999 | Gustin et al. | | 404/108 |
| 5,988,935 A * | 11/1999 | Dillingham | | 404/79 |
| 6,371,689 B1 * | 4/2002 | Wiley | | 404/77 |
| 6,421,594 B1 * | 7/2002 | Erasmus | | 701/50 |
| 7,300,225 B2 | 11/2007 | Musil | | |
| 7,758,235 B1 * | 7/2010 | Collette | | 366/7 |
| 2004/0240939 A1 * | 12/2004 | Hays et al. | | 404/95 |
| 2008/0292401 A1 * | 11/2008 | Potts | | 404/95 |
| 2010/0104364 A1 * | 4/2010 | Benedetti | | 404/77 |

FOREIGN PATENT DOCUMENTS

| | | |
|---|---|---|
| DE | 230990 | 12/1985 |
| DE | 29519719 | 2/1996 |
| JP | 61502197 A | 10/1986 |
| JP | 11209918 A | 8/1999 |

OTHER PUBLICATIONS

Japanese Office Action mailed Jul. 3, 2012, which issued in corresponding JP Application No. 118417.

* cited by examiner

*Primary Examiner* — Thomas B Will
*Assistant Examiner* — Abigail A Risic
(74) *Attorney, Agent, or Firm* — Fish & Richardson P.C.

(57) ABSTRACT

A conveying system for conveying material having a tendency to stick, in particular a mobile conveying system for paving material used for constructing road mats has at least one conveying element which is accommodated in a conveying channel. The conveying element is directly or indirectly driven by at least one combustion engine. The conveying system has a primary heating device predominantly for the conveying element and/or the conveying system. Furthermore, the conveying system has at least one secondary heating device for at least partially relieving the primary heating device. The secondary heating device is operated with direct or indirect exit heat of the combustion engine. Alternatively, a combination of a primary heating device and at least one secondary heating device is provided, which secondary heating device is operated with exit heat originating from the combustion engine in order to at least partially relieve the primary heating device.

5 Claims, 1 Drawing Sheet

CONVEYING SYSTEM

The present invention relates to a conveying system for conveying material having a tendency to stick, in particular a mobile conveying system for providing material used for constructing road mats.

DE-U-295 19 718 discloses a mobile conveying system for feeding vehicles for road construction. The conveying system serves to transport e.g. bituminous and hot paving material on the conveying element. The conveying element and the paving material are heated during conveyance by a primary heating device. The primary heating device may be a heating device operating with liquid gas or electricity. Heating a conveying belt running on carrying rollers and deflection rollers reduces the tendency of the material to clog or stick at the conveying element and the rollers such that subsequent cleaning work is simpler and/or the frequency of the cleaning cycles can be reduced. In the case that the conveying system is driven by a combustion engine, the engine heat (form the cooling system and the exhaust system, and of other components which also generate heat) is emitted into the environment without being used.

U.S. Pat. No. 7,300,225 B discloses heating the bottom of a channel of a conveying system in a vehicle transporting a hot bituminous paving material mixture by using a combustion engine such that combustible hot vapors of the paving material are sucked off and are mixed under positive feeding pressure with hot exhaust gases of the combustion engine and are burnt in a special combustion region. The heat of the exhaust gases and the heat generated in the combustion process is guided along the bottom of the conveying channel and is then emitted into the atmosphere. This heating system constitutes the only heating device of the conveying system. Guiding and emitting the exhaust gases and substances originating from combustion through the conveying system and out of the conveying system cannot be tolerated for environmental reasons.

DD 230 990 A discloses to provide several conveyor levels for conveying seed shells in a self-propelled harvester thresher. Heated exit air originating from the combustion engine is supplied counter to the conveying direction to the conveyor levels and the seed shells gliding on the conveying system in order to condition the seed shells or seeds for the threshing process.

It is an object of the invention to provide a conveying system of the kind as disclosed at the beginning, and to provide a heating system which allows to save energy and does not endanger the environment.

This object of the present invention is achieved with a system that includes at least Conveying system for conveying material having a tendency to stick, in particular a mobile conveying system for paving material used for constructing road mats, comprising:

at least one conveying element accommodated in a conveying channel, the conveying element being driven directly or indirectly by at least one combustion engine, and a primary heating device predominantly for the conveying element and/or the entire conveying system, wherein the conveying system has at least a secondary heating device for at least partially relieving the primary heating device, the secondary heating device being operated with direct or indirect exit heat emitted by the combustion engine; or, in another embodiment, a mobile conveying system for conveying material having a tendency to stick, for paving material used for constructing road mats, comprising:

at least one conveying element accommodated in a conveying channel, the conveying element being driven directly or indirectly by at least one combustion engine, and a primary heating device predominantly for the conveying element and/or the entire conveying system, wherein a combination of a primary heating device and of at least one secondary heating device, which secondary heating device is operated with exit heat emitted by the combustion engine in order to at least partially relieve the primary heating device.

According to one embodiment of the invention, the exit heat from the combustion engine is used in a secondary heating device of the conveying system in order to at least partially relieve the provided primary heating device. In this fashion energy which is required for operating the primary heating device can be reduced. In the case of relatively ideal conditions it is not even necessary to at least temporarily operate the primary heating device. Besides exit heat from the combustion engine, of course, heat originating from the exhaust system can also be used, however, without directly directing exhaust gases into the secondary heating device.

In another embodiment, the conveying system can be heated without endangering the environment by the combination of the primary heating device and the secondary heating device using exit heat from the combustion engine, since the primary heating device which the combustion engine e.g. supplies with electric power via a generator, can be relieved by the secondary heating device to a significant extent or even under ideal conditions may be temporarily completely switched off. Energy is saved in a dual fashion, and the environment is relieved since the combustion engine which has to be run anyway, feeds unavoidable exit heat to the secondary heating device of the conveying system without directly introducing exhaust gases, which heat is in a certain proportion to the engine load. The result is that the electric primary heating device consumes less electric power, whereby in turn, due to a lower engine load the fuel consumption may be reduced. The primary heating device, anyway, operates without endangering the environment, as no exhaust gases are produced while producing heat, since the efficiency is high, and since the electrically produced heat can be controlled well and can be directed and guided upon demand.

In an expedient embodiment an engine exit heat air collecting and/or guiding system is provided which extends from the combustion engine into the region of the conveying element. In the collecting and/or guiding system the emitted exit heat of the combustion engine is collected with the air and is directed in the form of a hot air current into the region of the conveying element. The air current is the carrier of the heat energy. The air current does not contain any exhaust gases of the combustion engine in order to operate the secondary heating device without endangering the environment.

The engine exit air collecting and/or guiding system, expediently also collects heat generated by components which are driven by the combustion engine either directly or indirectly, e.g. from the following group: brakes, exhaust gas pipes, components of the drive system, hydraulic motors, pumps, generators, transformers. This approach avoids emitting the generated exit heat of these components into the atmosphere without being used, which heat unavoidably is generated during the operation of the conveying system or the vehicle in which the conveying system is integrated. Moreover, even the heat from the components is directed into the secondary heating device and used on the conveying system, i.e. on the components of the conveying system and in some cases even on the material which is conveyed.

With a view to environmental friendliness it is expedient in the conveying system to use as the primary heating device an electric heating device or a gas heating device. Such heating systems are characterized by a favorable efficiency and by the fact that they load the environment only negligibly.

In an expedient embodiment, the electric primary heating device comprises at least one generator, which preferably is driven by the combustion engine, and infrared heating elements and/or aerial heating bodies and/or heating bands or heating rods which are supplied with electric power from the generator. Such an electric primary heating device offers the advantage that no exhaust gases are generated when producing heat, and that the generated heat can be brought very efficiently into those regions of the conveying system in which the heat is best utilized.

In a preferred embodiment the primary heating device predominantly is associated to the top side of the conveying element while the secondary heating device predominantly is associated to the lower side of the conveying element. Alternatively, this arrangement can be inverted. Preferably, the conveying element is a rubber conveyor belt in an upwardly inclined conveying channel, in which the rubber conveying band is arranged on carrying rollers and deflection rollers. The primary heating device heats the upper flight of the conveying band, and in some cases the material conveyed, and the regions between the conveying belt and the carrying rollers or deflection rollers, namely those regions within which relative movements occur which allow the intrusion of the conveyed contaminating material. The secondary heating device e.g. is heating the lower flight of the conveying belt and also heats around the conveying belt as well as the carrying rollers and the deflection rollers from the lower side, e.g. in order to heat already sticking material such that it automatically melts off, and in order to additionally build up a heat shield due to which the primary heating device consumes less energy while efficiently heating from above.

The combustion engine is provide in an expedient embodiment in an engine station situated below a conveying channel. The engine station is insulated and forms an encapsulation for the combustion engine. The engine station has at least one surrounding air inlet, which preferably is directed to the ground, in order to suck in surrounding air by thermal effects and to allow the sucked-in surrounding air to move upwardly. The introduction of surrounding air even may be assisted by a fan. Alternatively, the mentioned additional components could be arranged in a different way. Furthermore, the engine station may be combined with the engine exit air collecting and/or guiding system which e.g. is situated between the combustion engine and the lower side of the conveying element. The exhaust system of the combustion engine also may belong to the components which produce heat during operation of the combustion engine. However, the exhaust gases of the combustion engine are not directly supplied into the secondary heating device, but only heat which can be taken from the exhaust system is brought into the secondary heating device, e.g. by means of heat exchangers or the like, such that the conveying system does not emit toxic engine exhaust gases which could endanger the environment. In this fashion, the secondary heating device is an exit heated air heating device for the conveying system which heating device is operated without endangering the environment and is also operated free from exhaust gases of the combustion engine.

The conveying system, expediently, is used in a road construction machine which may be a road paver or a feeding vehicle. In the road construction machine the combustion engine which supplies the secondary heating device with exit heat may constitute a direct or indirect driving source not only for the conveying element, but also for driving components and functional components of the road paver or the feeding vehicle. Since the combustion engine has to output a relatively high output power due to the plurality of consumers which either are driven or supplied by the combustion engine, i.e., the combustion engine has to output more power than is necessary for operating the conveying system alone. The combustion engine generates a considerable amount of exit heat which contributes in the secondary heating device in a marked fashion to heat the conveying system and to significantly relieve the primary heating device. The primary heating device then may even be switched off completely.

An embodiment of the invention will be explained with the help of the drawings. In the drawings.

Figure 1:
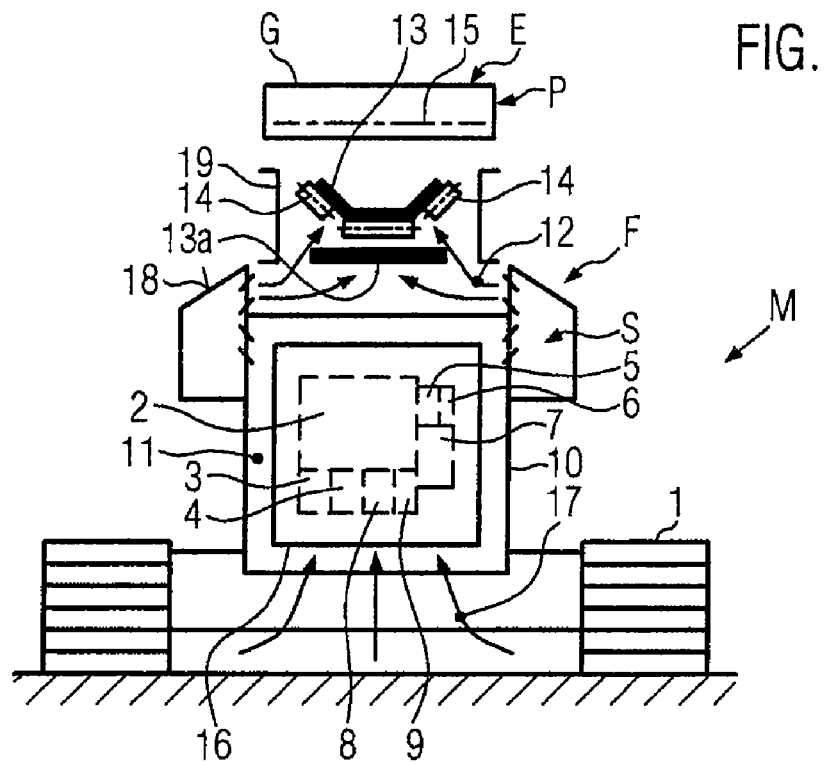
FIG. 1 is a schematic cross-sectional view of a mobile conveying system.
Figure 2:
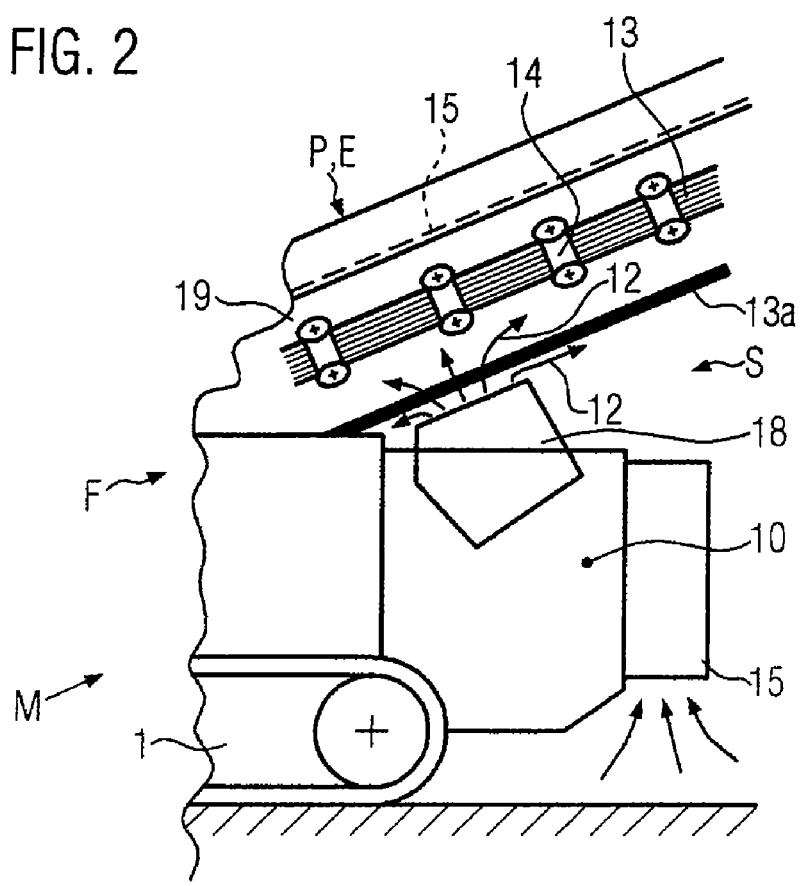
FIG. 2 is a schematic longitudinal section of a part of the conveying system of FIG. 1.

A conveying system F schematically illustrated in FIGS. 1 and 2 is a mobile conveying system F in the shown embodiment, which conveying system F is driven by a combustion engine 2 and may travel with the help of the combustion engine. The principle of the invention as well may be used for conveying systems which are not mobile and which use at least one combustion engine as a driving source and e.g. for a pivoting drive or an inclining drive of the conveying system F.

The conveying system F in FIGS. 1 and 2 e.g. is integrated into a road construction machine like a road paver or a feeding vehicle. The combustion engine 2 and the conveying system F may be arranged on an undercarriage 1, preferably together with other not specifically shown components and functional parts. The combustion engine 2 may directly drive a conveying element 13 of the conveying system F, e.g. a rubber conveying belt which is arranged on carrying rollers and deflection rollers 14. The conveying element 13 e.g. is driven via a gear mechanism 3, or via a pump drive 4 including a pump supplying a hydraulic motor (not shown). Furthermore, the combustion engine 2 may drive other driving components 8 of the road construction machine M. As is conventional, a cooling system 9 is provided, e.g. including a cooling medium, a radiator and a fan. Furthermore, the combustion engine 2 may directly drive a generator 7 via an intermediate gear mechanism. The generator 7 supplies, in some cases, at least one electric motor for driving the conveying element 13 of the conveying system F and/or other components of the road construction machine by electric power. Finally, an exhaust system 5 of the combustion engine 2 is provided including exhaust pipes which are not shown in detail, and which co-operate e.g. with a heat exchanger 6, which gains at least a part of the heat emitted from the engine in the exhaust gases. The combustion engine 2 can be a diesel engine, a gasoline engine or a gas engine.

The combustion engine 2 is accommodated in an encapsulating engine station 10, expediently together with the above-mentioned components and equipment parts which also generate heat during operation. The engine station 10 may comprise a heat insulating outer shield 11 and, e.g., inlet openings 16 for surrounding air (arrow 17), which inlet openings 16 e.g. are arranged such that they face the ground. The cooling system 9 of the combustion engine 2 may comprise a powerful fan (not shown) transporting exit heat from the not shown radiator into the engine station 10. In some cases, at least a further fan may be provided in the region of the inlet openings 16, and/or at the transition to heated air guiding devices 18. The powerful fan may be driven directly (via a gear system or a belt drive) or indirectly (electrically or hydraulically) by the combustion engine 2.

The engine station 10 is arranged below, preferably close to, a conveying channel 19 of the conveying system F and communicates via the air guiding devices 18 as a part of an engine exit air collecting and/or guiding system e.g. with a lower region of the conveying channel 19 such that heated exit air can be transferred to this region of the conveying channel 19.

The air heated by exit heat generated by the combustion engine 2 and by the equipment components also generating heat is flowing (arrows 12) from below and/or sidewardly to the conveying element 13 and the carrying rollers and deflection rollers 14, and mainly also against the surface of the lower flight 13a of the conveying element 13.

The conveying element 13 does necessarily have to be a rubber conveyor belt arranged on carrying rollers and deflection rollers, but instead could be a conveying auger, a slat belt conveyor, a metallic fabric band, or the like. The conveying system F, preferably serves for conveying a material which has the tendency to stick while being conveyed, like bituminous heated paving material used for constructing road mats.

The conveying system F has a primary heating device P which is associated to the conveying element 13 and the material conveyed on the conveying element 13, and also to the carrying rollers and deflection rollers 14 in the conveying channel 19. The primary heating device P is associated to the conveying element 13 e.g. from above and/or from below. The primary heating device B e.g. is an electric primary heating device E or a gas heating device G. In the case of an electric primary heating device P the heating device P e.g. includes as heating elements infrared radiators, radiant heating bodies, heating rods, heating bands 15, or the like, which are e.g. supplied with electric power from the generator 7 driven by the combustion engine 2.

Preferably, the primary heating device P is associated to the upper side of the conveying element 13. To the contrary, the engine exit heat collecting and/or guiding system serves as a heat source for a secondary heating device S, which, in the shown embodiment, predominantly is associated to the lower side of the conveying element 13 or the lower flight 13a in the conveying channel 19. The secondary heating device S is provided to relieve the primary heating device P as much as possible by means of exit heat originating from the engine which exit heat is generated unavoidably and is collected and directed accordingly, in order to reduce the necessary energy input for the primary heating device P or to even allow to sometimes completely switch off the primary heating device P. The relative arrangements of the heating devices P, S in relation to the conveying system F instead could be inverted or could be selected completely differently.

An important aspect of the invention is to functionally associate a combination of a primary heating device P, E and of a secondary heating device S operated with exit heat originating from the engine for at least partially relieving the primary heating device P, E without endangering the environment. The secondary heating device S allows in this combination a significant energy saving of the primary heating device. In the combination, the primary heating device P is operating without endangering the environment.

In the illustration of FIG. 2 it can be seen how the inlet openings 16 for the surrounding air are situated in a lower region at an air guiding system at the rear end of the engine station 10. The air guiding device 18 of the engine exit heat collecting and/or guiding system extends from the engine station 10 into the conveying channel 19 and predominantly to the lower flight 13a of the conveying element 13 and flushes the conveying element 13 with heated air 12. In this case the conveying system F may be an upwardly extending conveyor having a rubber conveying belt arranged on carrying rollers and deflecting rollers 14. The rollers 14 may be inclined in relation to each other in order to form a trough of the rubber conveyor belt. Expediently, the conveying channel 19 is covered at the upper side.

When implementing the conveying system F in a feeding vehicle, the conveying system F serves to convey heated bituminous paving material from a material hopper of the feeding vehicle to a material hopper of a road paver which is travelling behind or sidewardly offset to the feeding vehicle. In some cases, the feeding vehicle may be equipped with two conveying systems F in order to convey different sorts of paving material or to supply paving material simultaneously to several road pavers. Alternatively, the conveying system F may be inserted into a road paver and, in this case, may be an upwardly inclined conveyor which feeds one sort of paving material over the paving screed of the road paver to a road paver which is working behind the first road paver. In another case, the conveying system may be the conventional conveying system arranged in a chassis of the road paver. This conveying system conveys paving material from a material hopper situated at the front end of the road paver through the chassis of the road paver to the rear end of the chassis and to a location in front of a distributing auger which is arranged at the rear end of the chassis.

By operating the conveying system F while it is heated by the primary heating device P and/or the secondary heating device S the effect is reduced that the conveyed material sticks to the conveying element 13 and to the guiding components of the conveying element 13. The effect may even be eliminated, at least to an extent such that cleaning work becomes easier or the frequency of cleaning cycles may be reduced. For example, components of the conveying system F first are heated by both heating devices P, S. The secondary heating device S permanently is operated with full power. The primary heating device B e.g. is regulated in order to maintain a certain temperature, and finally may be switched off completely, as soon as the secondary heating device S is able to substantially hold the temperature alone.

In the embodiment shown in FIGS. 1 and 2 practically all components of the combustion engine 2 and of systems driven by the combustion engine 2, which produce heat during operation, are combined e.g. in the engine station 10 in order to allow to collect as much exit heat as possible and to use collected exit heat in the secondary heating device S. However, instead only exit heat of fewer components or only of the combustion engine 2 including the cooling system could be used for supplying the secondary heating device S. Expediently also the exhaust gas system of the combustion engine 2 is integrated, as the exhaust gas system generates a lot of heat which normally is not used. This heat could be used in a simple way such that the exhaust gases are directly guided into the conveying channel 19. However, this is not expedient for environmental reasons. So for environmental reasons at least a part of the heat of the exhaust gases is gained via at least one heat exchanger and is then supplied to the secondary heating device S.

The invention claimed is:

1. Conveying system for conveying paving material used for constructing road mats, comprising:
   at least one conveying element accommodated in a conveying channel and driven directly or indirectly by at least one combustion engine having an exhaust system,
   the combustion engine being encapsulated in an insulated engine station having at least one ambient air inlet opening facing the ground, a primary heating device for heating the conveying element, and an apparatus for conducting ambient air from the ambient air inlet and heat emitted by the combustion engine and the engine exhaust system without directly introducing gases from the exhaust system of the combustion engine to the conveying channel and for flushing the conveying element with the heated air to at least partially relieve the simultaneously operating primary heating device.

2. A conveying system according to claim 1, the apparatus for conducting heat emitted by the combustion engine includes an engine exit air collecting and/or guiding system extending from the encapsulated combustion engine station into the region of the conveying element.

3. A conveying system according to claim 1, wherein the primary heating device is functionally associated-to one side of the conveying element, and the apparatus for conducting ambient air and heat emitted by the combustion engine is functionally associated to the other-side of the conveying element.

4. The conveying apparatus of claim 1, including a heat exchanger associated in the encapsulated combustion engine with the exhaust system of the combustion engine, the heat exchanger taking heat from the exhaust system emitted from the combustion engine in the exhaust gases and supplying heat taken from the exhaust system to the apparatus for conducting heat to the conveying channel.

5. The conveying apparatus of claim 1, wherein the encapsulated combustion engine station contains an additional fan for flushing the conveying element with the heated air.

* * * * *